United States Patent [19]
Douglas et al.

[11] Patent Number: 5,668,736
[45] Date of Patent: Sep. 16, 1997

[54] METHOD FOR DESIGNING AND ILLUSTRATING ARCHITECTURAL ENHANCEMENTS TO EXISTING BUILDINGS

[75] Inventors: Edwin S. Douglas, Flintridge, Calif.; Daryl V. Turner, Scottsdale Ranch, Ariz.

[73] Assignee: Mr. Arch, Inc., Glendale, Calif.

[21] Appl. No.: 377,702

[22] Filed: Jan. 25, 1995

[51] Int. Cl.$^6$ .................................................. G06T 11/00
[52] U.S. Cl. ........................................ 364/512; 434/79
[58] Field of Search ............................... 364/512, 522, 364/560, 167.01; 395/164, 10, 100, 152, 155; 358/403; 356/376; 382/276, 305; 434/72, 74, 75, 76, 79, 80

[56] References Cited

U.S. PATENT DOCUMENTS

| | | | |
|---|---|---|---|
| 4,111,696 | 9/1978 | Sirlin | 96/42 |
| 4,275,449 | 6/1981 | Aish | 364/512 |
| 4,642,780 | 2/1987 | Thomson | 364/512 |
| 4,791,579 | 12/1988 | Kranitzky | 364/518 |
| 4,885,694 | 12/1989 | Pray et al. | 364/464 |
| 4,947,322 | 8/1990 | Tenma et al. | 364/401 |
| 4,964,060 | 10/1990 | Hartsog | 364/512 |
| 4,965,740 | 10/1990 | Schofield et al. | 364/512 |
| 4,970,666 | 11/1990 | Welsh et al. | 364/522 |
| 5,091,869 | 2/1992 | Ingram et al. | 364/560 |
| 5,227,983 | 7/1993 | Cox et al. | 364/512 |
| 5,237,657 | 8/1993 | Pearman et al. | 395/164 |
| 5,321,520 | 6/1994 | Inga et al. | 358/403 |
| 5,337,149 | 8/1994 | Kozah et al. | 356/376 |
| 5,455,765 | 10/1995 | Pryor | 364/167.01 |
| 5,490,232 | 2/1996 | Asano et al. | 395/10 |
| 5,584,025 | 12/1996 | Keithley et al. | 395/615 |

*Primary Examiner*—Kevin J. Teska
*Assistant Examiner*—Russell W. Frejd
*Attorney, Agent, or Firm*—Stephen A. Gratton

[57] ABSTRACT

A method for preparing drawings for remodeling buildings and visual images representative of the remodeled building is provided. As a first step, design ideas that utilize predetermined building products are cataloged in a format such as video tape. These design ideas are presented to a client such as a homeowner. Drawings and visual images are then prepared that incorporate the selected design ideas into the layout of the building. The drawings and visual images are prepared using photographs, sketches, and measurements obtained and electronically transmitted to a design center with the aid of a pen-pad computer. The method of the invention is useful in preparing construction drawings and in marketing a remodeling project to an client.

15 Claims, 2 Drawing Sheets

METHOD FOR DESIGNING AND ILLUSTRATING ARCHITECTURAL ENHANCEMENTS TO EXISTING BUILDINGS

FIELD OF THE INVENTION

This invention relates generally to the building and construction industry and more particularly to a novel method for preparing construction drawings suitable for remodeling existing buildings and visual images that depict the building remodeled with selected design ideas. The method of the invention is particularly suited to remodeling homes and apartments and to marketing remodeling products and services to homeowners.

BACKGROUND OF THE INVENTION

One important segment of the building and construction industry is in the remodeling and upgrading of building interiors and exteriors. In particular, home remodeling has grown significantly over the last several years. General economic conditions have made it much more difficult for homeowners to sell their homes and trade up. Consequently many homeowners are remodeling or enlarging their present residences. Remodeling improves property values and enhances the livability of a home. It also allows modern designs and features to be incorporated into existing homes.

In the past it has been common practice for remodelers to prepare detailed construction drawings for a remodeling project. Typically, construction drawings include detailed plans and bills of material which enable workers to perform a project. These technical types of drawings, however, may not be readily understood by some clients, such as an unsophisticated homeowner.

In order to assist the remodeler and client in visualizing the finished appearance of a remodeled room or building, architectural renderings and models are sometimes prepared. These renderings and models may also be difficult for some clients to understand, and many times do not convey an accurate representation of the completed project. In addition, they are expensive and time consuming to prepare.

Furthermore, the efforts of a remodeler in attempting to market the products and services associated with a project may be impeded by the time and effort required to present an accurate rendering to a client. A remodeler's success in selling a projection is often dependent on his presentation to a client. If a remodeler does not have the capability or support necessary to produce timely and easily understood presentations, potential sales are lost. This can put the small independent remodeler at a serious disadvantage in obtaining projects.

OBJECTS OF THE INVENTION

In view of the foregoing there is a need in the art for improved methods for preparing construction drawings and visual images for remodeling projects and for marketing the products and services associated with remodeling projects.

Accordingly it is an object of the present invention to provide an improved method for preparing construction drawings and visual images useful for remodeling buildings and for marketing the products and services associated with remodeling projects.

It is a still further object of the present invention to provide an improved method for producing visual images which depict the actual features of a building or room remodeled using selected design ideas.

Other objects, advantages and capabilities of the present invention will become more apparent as the description proceeds.

SUMMARY OF THE INVENTION

In accordance with the present invention, an improved method for producing drawings and visual images for remodeling buildings is provided. The method of the invention produces actual construction drawings and bills of material suitable for use in remodeling an existing building. In addition, the method of the invention produces visual images that represent the existing building remodeled with selected design ideas.

The method of the invention, generally stated, includes the steps: cataloging design ideas in a format which enables selection by a client; preparing photographs or digital images of an existing building; sketching and measuring the layout of the existing building; and then using this information to produce drawings and video images that depict the selected design ideas incorporated into the remodeled building.

For presenting a remodeling project to a client, a remodeler has a catalog that includes design ideas that utilize predetermined building products. By way of example, the design ideas can include door and window arches, decorative base trims, radiused walls, rounded corners, fireplace treatments and others. The client then selects those design ideas that he or she would like incorporated into the building. The remodeler prepares photographs or digital images of the client's building and generates rough sketches using a hand held computer. This information, along with the design selections, is then sent to a centralized design center. In order to expedite this process, some of the information is gathered using a pen pad computer, and is electronically transmitted by modem or fax machine. This information is used to produce drawings and visual images that show the design ideas incorporated into the remodeled building. The completed drawings and visual images are then presented to the client as a sales and visualization aid. Later the drawings can be used to perform the remodeling project.

DETAILED DESCRIPTION OF THE PREFERRED EMBODIMENTS

Figure 1:
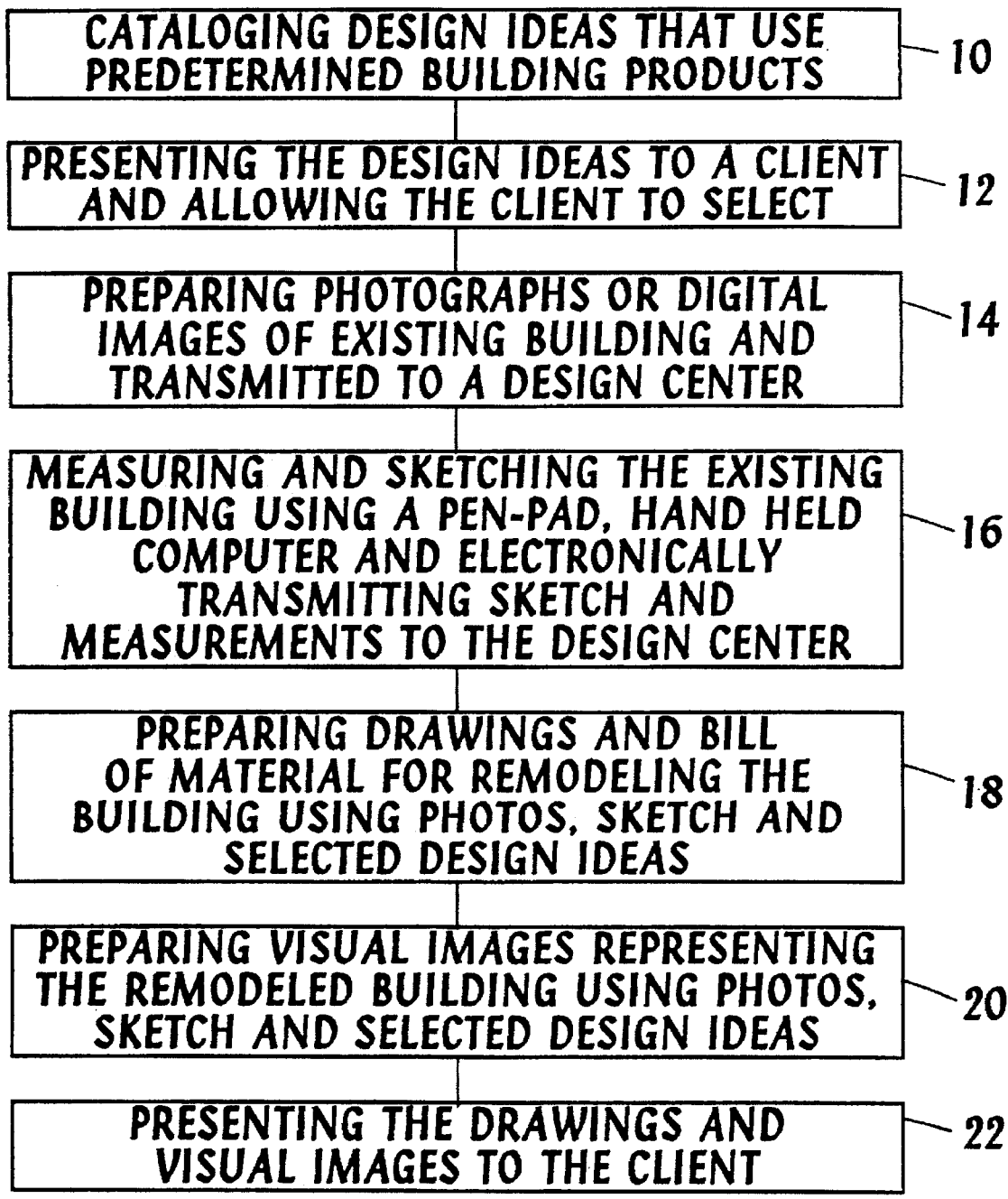
FIG. 1 is a flow diagram illustrating the steps involved in the method of the invention.

Referring now to FIG. 1 a flow diagram illustrating the method of the invention is shown. Initially, as represented by step 10, a remodeler has a catalog of design ideas. The catalog includes design ideas that utilize predetermined building products. These design ideas may be contained in a visual format such as a catalog with pictures, or in an electronic format such as video tape. Preferably, the catalog contains provisions for printing a hard copy of any of the design ideas. As an example, a video printer may be used in conjunction with a video tape to print the ideas of interest. Suitable video printers are manufactured by Hewlett Packard and Texas Instruments.

By way of example, representative design ideas can include decorative base trims, corbels, decorative plinths, arch surrounds, barrel arches, niches, column bases, radius walls, plant stands, rounded corners, fireplace treatments, arched fireplaces, radius window surrounds, door arches, columns, bases, decorative statues and others.

Next, as represented by step 12, the remodeler presents the design ideas to a client and allows the client to select ideas of interest. Typically, the client will be a homeowner interested in remodeling an interior room or an exterior portion of his home. This presentation can be made at the building to be remodeled or at another location.

Next, as represented by step 14, the remodeler prepares photographs or digital images of the portions of the building to be remodeled. These photographs are sent or modemed to a design center to be subsequently used for preparing construction drawings and visual images of the building. Alternately, digital images can be prepared using a video digitizer. Suitable digitizers are manufactured by Hitachi and others. These digital images can be electronically transmitted to the design center.

Next, as represented by step 16, the remodeler measures and sketches the portions of the building to be remodeled. This information is also transmitted to the design center. This information is preferably gathered and electronically transmitted to the design center using a hand-held pen pad computer connected to an electronic transmission means such as a modem or fax machine. The pen pad computer includes a writing surface on which sketches and graphics may be made by hand using a pen. Such a pen pad computer is adapted to produce a hard copy or transfer the information to the memory of another computer.

Such pen pad computers, and software for connecting the pen pad computer to modems or fax machines, are commercially available from computer manufacturers such as Apple Computer, Inc. and Amstrad. One suitable pen-pad computer is a model No. Newton 110 manufactured by Apple. A suitable software program is manufactured by Star Core and is called Draw Pad. Using such a system the remodeler can sketch by hand the layout and dimensions of the building and electronically transmit this information to the design center.

Next, as represented by step 18, drawings are prepared at the design center utilizing the design selections, photographs, sketches and measurements obtained by the remodeler in steps 12, 14 and 16. A complete set of construction drawings is prepared including plan views, elevation views, perspective views and detail views. In addition, a bill of materials listing the materials required for the remodeling project and a detailed estimate of the costs associated with the remodeling project are prepared. The materials include predetermined products utilized for implementing the design ideas contained in the design catalog and selected by the client. The drawings and bill of material may be prepared using standard drafting techniques or a Computer Aided Design (CAD) package.

Next, as represented by step 20, visual images, such as color pictures, color slides or video tapes, are prepared using the design selections, photographs, sketches and measurements obtained during steps 12, 14 and 16. The visual images superimpose or "morph" images of the selected design ideas into the existing building layout to illustrate the appearance that the building will have after remodeling. The appearance of the remodeled building can thus be clearly understood by the client. The visual images can be presented to the client as a hard copy or incorporated into an electronic format such as video tape. Such visual images may be prepared utilizing commercially available computer hardware and software.

In general, these visual images are prepared by a morphing process. Morphing is the process of converting one image to another by warping the original image to some intermediate distorted shape and then warping the distortion shape back to the second image over the course of a number of animated frames.

By way of example, one suitable computer system for producing morphed visual images as outlined above is manufactured by HSC Software, Inc, and is designated HSC Digital Morph. Suitable software is manufactured by Visual Software under the trademark Visual Reality.

Next, as represented by step 22, the drawings and visual images are presented to the client for review. This information illustrates the appearance of the building following the anticipated remodeling in a format that can be readily appreciated by different clients. In addition to the drawings and visual images, costs estimates for the remodeling project are also presented to the client. Accurate cost estimates can be prepared by the remodeler using the drawings and bill of material.

Figure 2A:
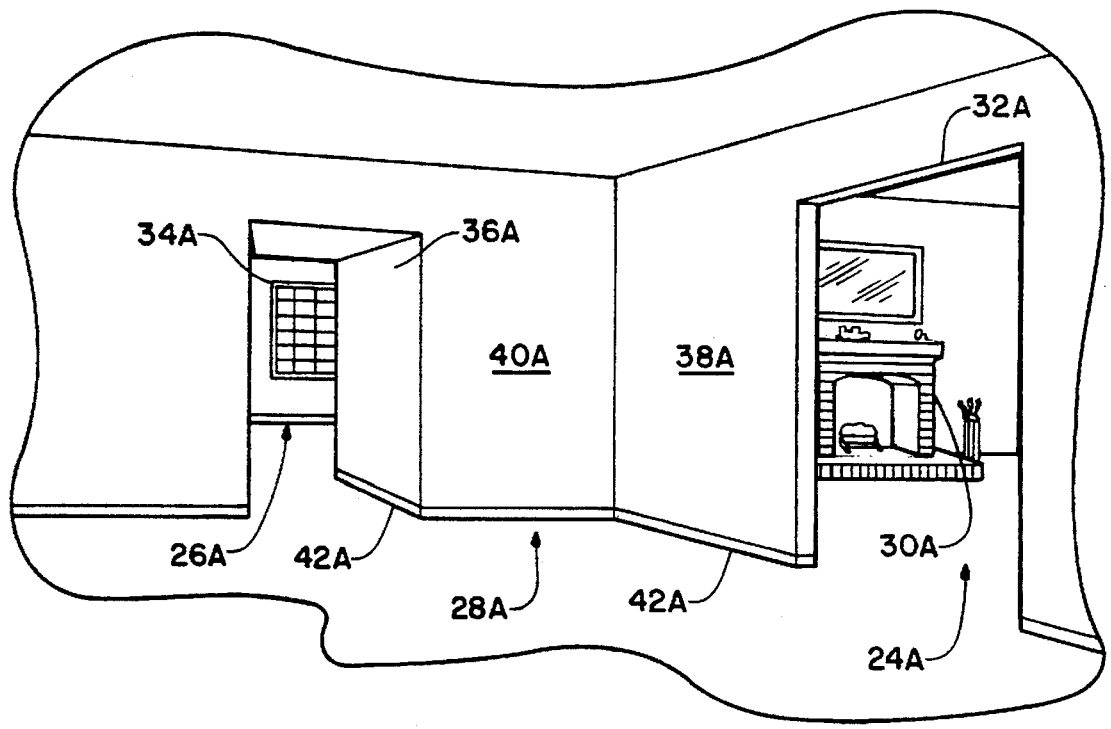
FIG. 2A is a perspective view of a layout of an existing building prior to remodeling.
Figure 2B:
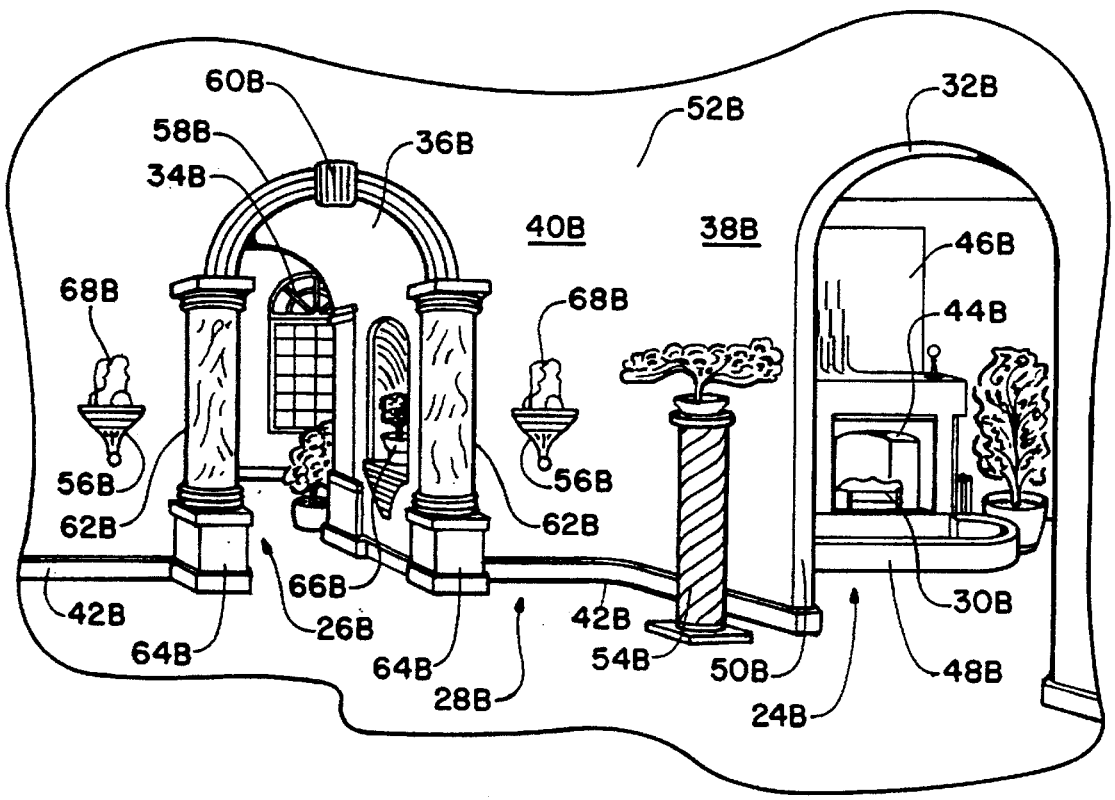
FIG. 2B is a perspective view illustrating a visual image of the building in FIG. 2A as it would appear following remodeling using selected design ideas.

FIGS. 2A and 2B illustrate the effect obtained by morphing selected design ideas into an existing building layout, to produce a visual image of the building after remodeling. In FIG. 2A a building interior layout includes an existing first room 24A and an existing second room 26A which are accessed through an existing hallway 28A. The first room 24A includes a fireplace 30A and a rectangular shaped doorway 32A. The second room 26A includes a rectangular shaped window 34A and a rectangular shaped entrance corridor 36A. The hallway 28A includes walls 38A and 40A with baseboards 42A that intersect at a ninety degree angle. The layout illustrated in FIG. 2A would be contained in the information obtained during photographing, (step 14) and sketching and measuring, (step 16). Dimensions (not shown) could also be included in this layout.

FIG. 2B illustrate a visual image of the same rooms after step 20 is performed. During this step design ideas selected by the client are morphed into the layout of the existing building. The visual image represented by FIG. 2B may be contained on a video tape, color slide, or color picture or Visual Reality.

In FIG. 2B a remodeled room 24B includes a remodeled fireplace 30B having a fireplace arch 44B and a fireplace treatment 46B. A radiused wall 48B encloses the fireplace 30B. In addition, remodeled room 24B includes an arched doorway 32B having rounded corners 50B.

In the remodeled hallway 28B, walls 38B and 40B are joined with an inside radius 52B. The remodeled hallway 28B also includes decorative baseboard 42B, a plant stand 54B, decorative corbels 56B and decorative statues 68B.

Remodeled room 26B includes a window having a radius window surround 34B. The entranceway to remodeled room 26B includes a barrel arch 36B, arch surround 58B, decorative plinth 60B, columns 62B, bases 64B and a niche 66B.

The various design ideas or features illustrated in FIG. 2B are included in the catalog of design ideas. In addition these design ideas can be implemented using predetermined construction products such as drywall accessories (e.g., bullnose supports for archways and inside and outside radii).

Thus the invention provides an improved method for producing construction drawings and visual images for remodeling existing buildings. The method of the invention enables remodeling projects to be performed quickly and efficiently. In addition, the method of the invention allows an effective presentation to be made by a remodeler to a client such as a homeowner.

While the invention has been described with reference to a preferred embodiment, as will be apparent to those skilled in the art, certain changes and modifications can be made without departing from the scope of the invention as defined by the following claims.

What is claimed is:

1. A method for remodeling an existing building, said method comprising:
   cataloging design ideas that utilize predetermined building products;
   presenting the design ideas to a client;
   allowing the client to select a design idea that utilizes a selected predetermined building product;
   preparing photographs or digital images of the building and transmitting a photograph or digital image to a design center;
   measuring and sketching the building and transmitting a sketch and measurements to the design center;
   preparing a drawing at the design center from the photograph or digital image, sketch and measurements, said drawing incorporating the design idea selected by the client into the building; and
   preparing a visual image from the photograph or digital image, sketch and measurements, said visual image representing the building remodeled with the design idea selected by the client.

2. The method as claimed in claim 1 and wherein:
   sketching the building is with a pen-pad computer.

3. The method as claimed in claim 1 and wherein:
   the design center is at a location different than the building and transmitting the sketch and measurements comprises electronic transmission.

4. The method as claimed in claim 1 and wherein:
   the visual image comprises a video tape or a photograph.

5. The method as claimed in claim 1 and wherein:
   the selected predetermined building product is selected from the group consisting of decorative base trims, corbels, decorative plinths, arch surrounds, barrel arches, niches, column bases, plant stands, round corners, radiused walls, fireplace treatments, arched fireplaces, radiused window surrounds, door arches, columns, bases, and decorative statues.

6. A method for remodeling an existing building comprising:
   cataloging design ideas that utilize predetermined building products;
   presenting the design ideas to a client;
   allowing the client to select a design idea that utilizes a selected predetermined building product;
   photographing the building and transmitting a photograph to a design center at a location different than the building;
   measuring and sketching the building on a pen-pad computer;
   electronically transmitting a sketch and measurements of the building to the design center using an electronic transmission means connected to the pen-pad computer;
   preparing a construction drawing from the photograph, sketch, and measurements, said drawing including the design idea selected by the client incorporated into the building; and
   preparing a visual image from the photograph, sketch and measurements, said visual image incorporating the design idea selected by the client into the building.

7. The method as claimed in claim 6 and wherein:
   the electronic transmission means comprises an electronic component selected from the group consisting of faxes and modems.

8. The method as claimed in claim 6 and wherein:
   the selected predetermined building product is selected from the group consisting of decorative base trims, corbels, decorative plinths, arch surrounds, barrel arches, niches, column bases, plant stands, round corners, radius walls, fireplace treatments, arched fireplaces, radius window surrounds, door arches, columns, bases, and decorative statues.

9. The method as claimed in claim 6 and wherein the visual image comprises a video tape.

10. The method as claimed in claim 6 and wherein the visual image comprises a color photograph.

11. The method as claimed in claim 6 and further comprising:
    printing a hard copy of the design idea selected by the client.

12. A method for preparing drawings suitable for remodeling an existing building and a visual image representative of the building after remodeling, said method, comprising:
    cataloging design ideas that utilize a building product selected from the group consisting of decorative base trims, corbels, decorative plinths, arch surrounds, barrel arches, niches, column bases, plant stands, round corners, radiused walls, fireplace treatments, arched fireplaces, radiused window surrounds, door arches, columns, bases, and decorative statues;
    allowing a client to select a design idea that utilizes a selected building product;
    preparing a photograph or digital image of the building and transmitting the photograph or digital image to a design center at a location different than the building;
    measuring and sketching the building with a pen-pad computer;
    electronically transmitting a sketch and measurements of the building to the design center using an electronic transmission means connected to the pen-pad computer; and
    preparing the drawings and the visual image from the photograph or digital image, sketch, measurements and the selected building product.

13. The method as claimed in claim 12 and wherein:
    the building comprises a home.

14. The method as claimed in claim 12 and wherein:
    the visual image includes a representation of the selected building product morphed into an existing feature of the building.

15. The method as claimed in claim 12 and wherein:
    the visual image includes a representation of the selected building product morphed into an existing feature of the building with a digital morphing process.

* * * * *